Aug. 15, 1961 A. R. ASKUE 2,996,168
DISCHARGE MECHANISM
Original Filed Aug. 12, 1957 2 Sheets-Sheet 1

INVENTOR.
ALBERT R. ASKUE
BY
Teare & Fetzer
ATTORNEYS

Aug. 15, 1961  A. R. ASKUE  2,996,168
DISCHARGE MECHANISM

Original Filed Aug. 12, 1957  2 Sheets-Sheet 2

INVENTOR.
ALBERT R. ASKUE
BY
Teare & Fetzer
ATTORNEYS

United States Patent Office 2,996,168
Patented Aug. 15, 1961

2,996,168
DISCHARGE MECHANISM
Albert R. Askue, Port Charlotte, Fla., assignor to The Cleveland Trencher Company, Cleveland, Ohio, a corporation of Ohio
Original application Aug. 12, 1957, Ser. No. 677,453. Divided and this application May 2, 1960, Ser. No. 26,309
5 Claims. (Cl. 198—126)

This invention relates in general to excavating machines and more particularly to discharging conveyor mechanism for such machines. This application is a division of the pending United States application of Albert R. Askue, Serial No. 677,453, filed August 12, 1957.

Shiftable discharge conveyor mechanisms for transferring material or soil from the digging unit of an excavating machine are known in the art. However, these prior art arrangements are usually relatively complex, resulting in a mechanism of considerable size, weight and cost, and generally are not easily and quickly controllable as concerns the shifting movement of the conveyor mechanism. Moreover, due to their complexity, they require considerable maintenance thereon resulting in high upkeep costs.

Accordingly, an object of the invention is to provide an improved discharge conveyor mechanism for an excavating machine and the like.

Another object of the invention is to provide an improved discharging conveyor mechanism for an excavating machine and the like wherein the discharging conveyor mechanism is adapted to extend transversely through the excavating unit of the machine for lateral shifting movement with respect to the excavating unit, and is actuated in such lateral shifting movement by means of a reciprocal fluid powered motor unit operatively connected to the conveyor mechanism for shifting movement therewith.

A further object of the invention is to provide a discharging conveyor mechanism of the latter type which is of relatively light weight, compact construction, and which can be more quickly and readily actuated as compared to heretofore known arrangements.

Briefly, the foregoing objects are accomplished in accordance with the invention by the provision of a discharge conveyor mechanism comprising a discharge conveyor including a frame mounted for lateral shifting movement on a support, together with means for shifting the conveyor transversely of the support, with said means comprising a fluid powered reciprocal motor unit operably connected to the frame for transverse movement therewith, and including means extending between the frame and the support and coacting with the motor unit, to move or shift the conveyor frame upon actuation of the motor unit.

Other features and advantages of the invention will be apparent from the following description taken in conjunction with the accompanying drawings wherein.

Figure 1:
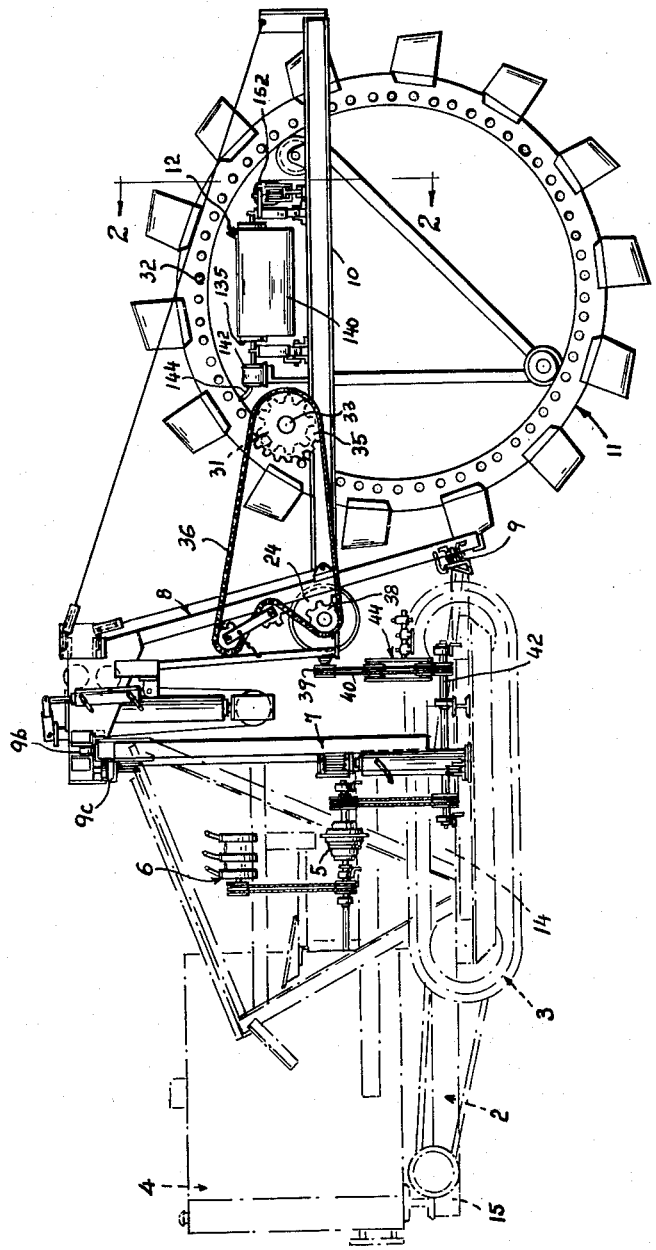
FIG. 1 is a side elevational view of an excavating machine embodying the invention.

In the drawings, the invention is illustrated as being applied to a crawler propelled excavating machine. Referring to the drawings, such a machine broadly comprises a base frame structure 2 supported on suitable tractor treads 3, a motor 4 mounted on the forward end of the machine, a power take-off unit 5 disposed behind the motor, a hydraulic pump unit 6, operatively connected to the motor unit, main mast structure 7 for supporting thereon supplementary mast structure 8 which embodies roller members 9, 9b and 9c for anti-friction, transverse shifting movement of mast 8 with respect to the machine chassis, digging boom structure 10 which is mounted for vertical movement on supplementary mast 8, an excavating unit 11 which is rotatably mounted on boom 10, and an unloading conveyor 12 extending transversely through excavating unit 11 and adapted for lateral shifting movement with respect to unit 11 and the machine chassis.

Frame structure 2 is of more or less conventional character and comprises a base portion 14 (FIG. 1) and forwardly extending sills 15 for mounting motor 4 thereon.

The excavating wheel 11 is driven by sprocket wheels 31 which coact with a series of pins 32 on both sides of the wheel (FIG. 1). Wheels 31 are drivingly connected to shaft 33 which is drivingly connected to a sprocket wheel 35 which, in turn, is connected by any suitable means (illustrated in the drawings by drive chain 36) to a sprocket wheel 38 connected to differential unit 24 mounted on supplemental mast structure 8. Differential unit 24 has a sprocket wheel 39 extending forwardly thereof which is drivingly connected by means of drive chain 40 to a sprocket wheel attached to counter-shaft assembly 42 on the machine chassis. In this connection a chain tensioning device 44 (FIG. 1) is provided, around which chain 40 is looped to take up slack in the latter.

Figures 2, 3:
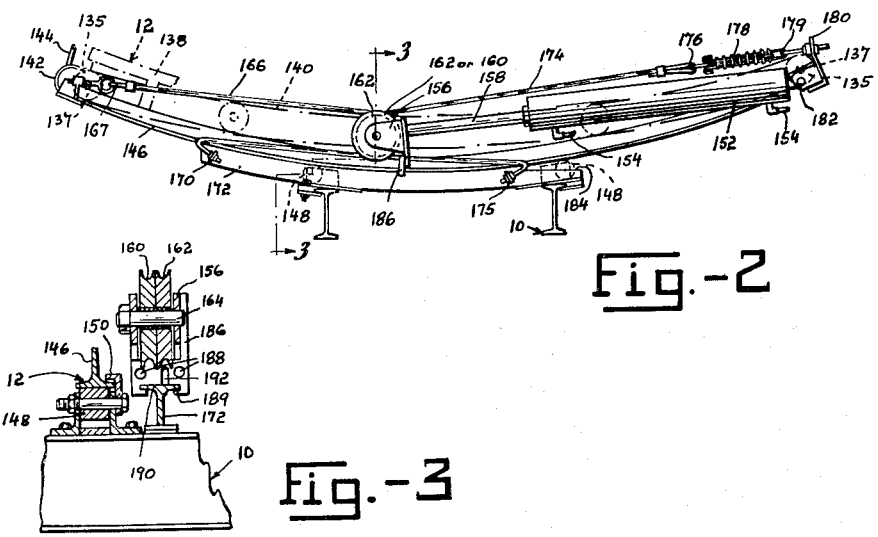
FIG. 2 is a fragmentary elevational view of the unloading conveyor of the machine and associated hydraulic actuating unit taken generally along line 2—2 of FIG. 1 and represents the mechanism with which the instant divisional application is particularly concerned.
FIG. 3 is a fragmentary vertical sectional view taken generally along line 3—3 of FIG. 2.

Referring in particular to FIGS. 2 and 3, the unloading conveyor 12, to which the invention of the instant application is particularly directed, extends through excavating unit 11 transversely of the machine chassis and comprises at opposite ends thereof a drum 135 mounted on shaft 137 carried by an arcuate contoured (in side elevation) conveyor frame 138. Drums 135 carry an endless belt element 140 for receiving excavated material from excavating unit 11 and carrying it to either side of the machine, for discharge thereof.

Suitably attached to shaft 137 on one end of conveyor 12 is a hydraulic motor 142 connected by feed lines 144 to pump unit 6 and suitable valve mechanism (not shown) is provided for controlling the flow of pressurized fluid to motor 142. Motor 142 may be driven in either direction to thereby provide for reversing the direction of travel of belt 140 of the conveyor. Conveyor frame 138 includes spaced arcuate-like rail members 146 which are mounted on rollers 148 on the boom structure 10 for providing for anti-friction movement of the conveyor during transverse shifting thereof. Flange 150 overlapping a portion of the rail members 146 maintains the conveyor in assembled condition on the boom.

In accordance with the invention transverse movement of the conveyor with respect to the excavating unit 11 and machine chassis is accomplished by hydraulic piston and cylinder unit 152 in combination with a sheave and cable system. Unit 152 is of the double-acting type and is suitably connected as by means of feed lines 154 to pump unit 6 and suitable valve mechanism (not shown) of any conventional type is provided to control the flow of fluid to unit 152. A double-sheave cage 156 is connected to the end of plunger element 158 of unit 152 and a pair of sheaves 160 and 162 are rotatably mounted therein as by means of pin 164.

One end of a cable 166 is anchored as by means of eye bolt 167 to an outer end of the conveyor frame 138, loops around sheave 160 and then is anchored as at 170 to cylinder guide rail 172 attached to boom structure 10. One end of another cable 174 is anchored as at 175 adjacent the opposite end of guide rail element 172, is looped around sheave 162 in cage 156 and then is anchored as at 176 to compression spring unit 178 connected by means of eye bolt 179 to bracket 180 attached to an end of rail member 146. The cylinder end of hydraulic unit 152 is pivotally mounted as by means of pin 182 to bracket 180.

Upon outward movement of the plunger element 158 of unit 152 tension is applied to the top stretch of cable 174 which causes the latter to shift the conveyor toward the left as viewed in FIG. 2, while cable 166 moves laterally with the conveyor frame and is reeved about sheave 160 in cage 156 on plunger element 158. Upon inward movement of the plunger element, tension in the top stretch of cable 166 causes transverse shifting of the conveyor to the right as viewed in FIG. 2, while cable 174 moves laterally with the conveyor and is reeved about sheave 162 on the plunger element 158. Guide rail 172 has a tapered end surface 184 thereon to cam the outer or cylinder end of the hydraulic unit 152 above the boom structure and prevent interference between the latter and the hydraulic unit during such tranverse shifting movement. Sheave cage 156 has a bracket portion 186 attached to the underside thereof as by means of bolts 188 which overlaps as at 189 the top flange 190 of guide rail 172 to guide the movement of the plunger element 158 and attached sheave cage 156 and maintain it in coacting relationship with the guide rail during transverse shifting movement of the conveyor. An opening 192 is provided in bracket 186 through which the bottom strand of cable 174 extends.

While the discharge conveyor mechanism has been illustrated in connection with a particular type of trench excavating machine, it will be understood that such mechanism may be readily used with other types of trench excavating machines, and wherein compactness and simplicity of structure is necessary or desirable.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

I claim:

1. A discharge mechanism for an excavating machine and the like comprising a support, a discharge conveyor including an elongated frame mounted for lateral shifting movement on said support, and means for shifting said conveyor transversely of said support, said means comprising a reciprocal fluid powered motor unit supported by said frame for movement therewith during said transverse shifting movement of said conveyor, said motor unit extending in a direction generally transversely of said support, flexible means extending between said frame and said support and being attached thereto, said flexible means coacting with said motor unit upon actuation of the latter whereby said flexible means is tensioned to move said conveyor in a direction determined by the direction of stroke of said motor unit.

2. A discharge mechanism in accordance with claim 1 including rotatable means mounted on the reciprocal end of said motor unit, said rotatable means coacting with said flexible means to tension the latter during actuation of said motor unit, and means coacting between said rotatable means and said support for guiding said rotatable means during transverse shifting movement of said conveyor.

3. A discharge mechanism for an excaavting machine and the like comprising a support, a discharge conveyor including a frame mounted for lateral shifting movement on said support, and means for shifting said conveyor transversely of said support, said means comprising a double acting reciprocal fluid powered cylinder and piston motor unit mounted on said frame for transverse shifting movement therewith, said motor unit being pivotally supported at one end thereof by said frame and adjacent one end of said frame, a pair of independent idler pulleys mounted on the other end of said motor unit, a pair of flexible cable elements, one of said flexible cable elements being anchored at one of its ends to the other end of said frame then directed generally lengthwise and inwardly with respect to said frame and looped about one of said pulleys and then directed back in the opposite direction outwardly with respect to said frame to be anchored at the other of its ends adjacent the associated side of said support, the other of said flexible cable elements being anchored at one of its ends adjacent the pivotal connection of said motor unit to said frame then directed generally lengthwise and inwardly with respect to said frame and looped about the other of said pulleys and then directed in the opposite direction outwardly with respect to said frame to be anchored at the other of its ends adjacent the associated side of said support, said pulleys movably coacting in actuating relation with said cable elements to selectively tension the latter upon actuation of said motor unit to selectively shift said conveyor transversely of said support, and guide means mounted on said support and extending generally parallel to said frame coacting in guiding relation with said pulleys during transverse movement of the latter with respect to said support.

4. A discharge mechanism for an excavating machine and the like comprising a support, a discharge conveyor including an elongated frame mounted for lateral shifting movement on said support, means for shifting said conveyor transversely of said support, said means comprising a reciprocal double-acting fluid powered motor unit mounted on said frame for movement therewith during said transverse shifting movement of said conveyor, said motor unit extending generally transversely of said support parallel to said frame, flexible means extending between said frame and said support and being attached thereto, said last-mentioned means movably coacting with said motor unit upon actuation of the latter whereby said flexible means is tensioned to move the said conveyor in a direction determined by the direction of stroke of said unit, and a guide rail member attached to said support adjacent said frame and extending generally parallel with respect to said frame, said guide rail member being engageable with the underside of said motor unit during transverse shifting of said conveyor to prevent interference between said motor unit and said support.

5. A discharge mechanism for an excavating machine comprising, a support, a discharge conveyor including a frame mounted for lateral shifting movement on said support, and means for shifting said conveyor frame transversely of said support, said means comprising a double-acting reciprocal hydraulic motor unit having piston and cylinder elements, said unit extending lengthwise generally parallel to said frame, one of said elements being attached adjacent the outer end thereof to an end of said frame for movement with the latter during transverse shifting movement of said frame, the other of said elements having a sheave cage attached to the free end thereof, a plurality of sheaves rotatably mounted in said cage, a flexible member of predetermined length anchored at one end thereof to the other end of said frame, said flexible means being looped about one of said sheaves and being anchored at the other end thereof adjacent the side of said support corresponding to said other end of said frame, a second flexible member of predetermined length anchored to said one end of said frame and being looped about another of said sheaves and then anchored adjacent the other side of said support, said flexible members upon actuation of said unit pulling said conveyor transversely of said support in a direction depending upon the direction of movement of said sheave cage.

References Cited in the file of this patent

UNITED STATES PATENTS

| | | |
|---|---|---|
| 1,056,105 | Krupp | Mar. 18, 1913 |
| 2,598,339 | Askue | May 27, 1952 |
| 2,811,240 | Fenton | Oct. 29, 1957 |